May 1, 1962  D. G. REMPEL ET AL  3,031,720
METHOD OF FORMING HOLLOW PLASTIC ARTICLES
Original Filed Feb. 27, 1957  4 Sheets-Sheet 1

INVENTORS
DIETRICH G. REMPEL
FRANK A. PFEIFENROTH
BY
ATTORNEYS

May 1, 1962 D. G. REMPEL ET AL 3,031,720
METHOD OF FORMING HOLLOW PLASTIC ARTICLES
Original Filed Feb. 27, 1957 4 Sheets-Sheet 2

INVENTORS
DIETRICH G. REMPEL
FRANK A. PFEIFENROTH
BY

ATTORNEYS

May 1, 1962 D. G. REMPEL ET AL 3,031,720
METHOD OF FORMING HOLLOW PLASTIC ARTICLES
Original Filed Feb. 27, 1957 4 Sheets-Sheet 3

INVENTORS
DIETRICH G. REMPEL
FRANK A. PFEIFENROTH
BY
ATTORNEYS

May 1, 1962 D. G. REMPEL ET AL 3,031,720
METHOD OF FORMING HOLLOW PLASTIC ARTICLES
Original Filed Feb. 27, 1957 4 Sheets-Sheet 4
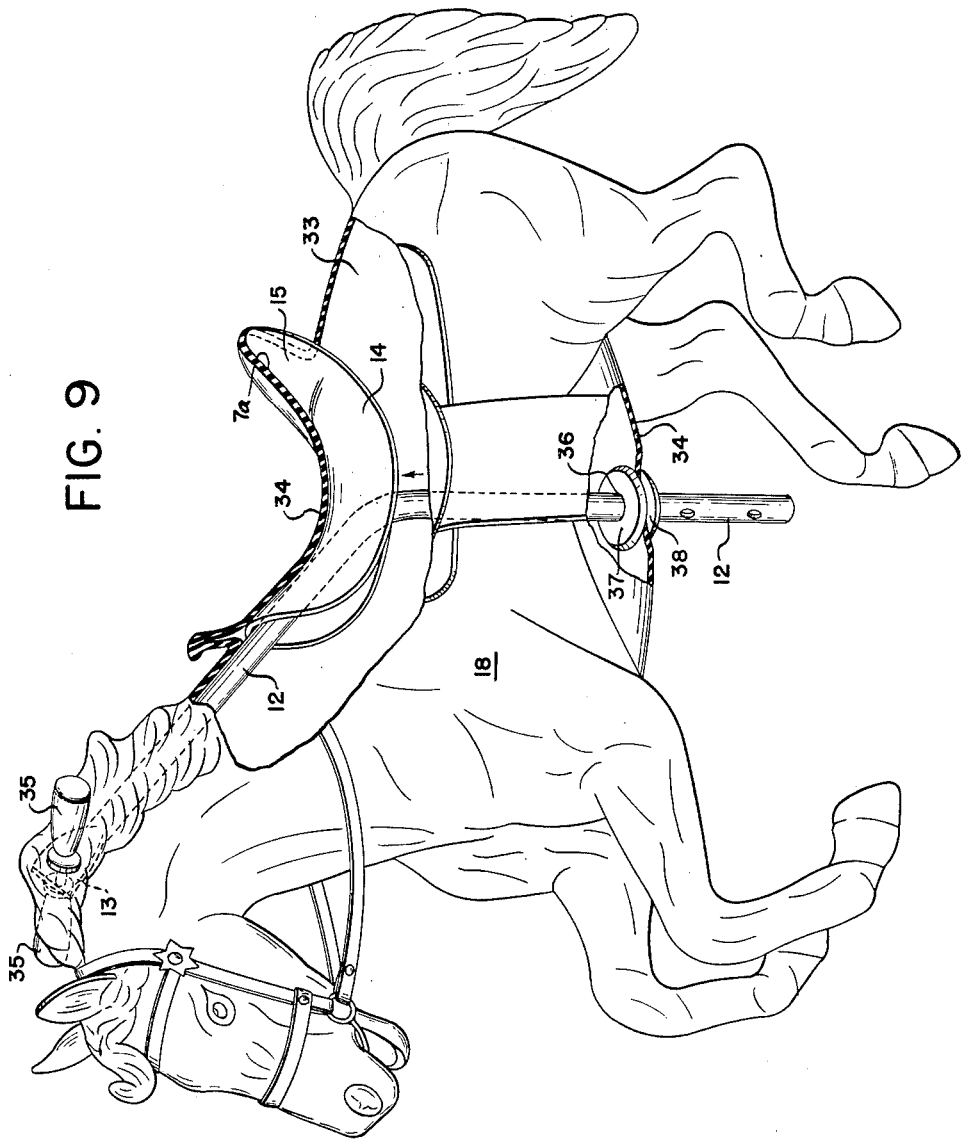
INVENTORS
DIETRICH. G. REMPEL
FRANK A. PFEIFENROTH
BY
ATTORNEYS

United States Patent Office 3,031,720
Patented May 1, 1962

3,031,720
METHOD OF FORMING HOLLOW PLASTIC ARTICLES
Dietrich G. Rempel and Frank A. Pfeifenroth, Akron, Ohio, assignors to Rempel Manufacturing, Inc., Akron, Ohio, a corporation of Ohio
Original application Feb. 27, 1957, Ser. No. 642,822, now Patent No. 2,978,244, dated Apr. 4, 1961. Divided and this application Feb. 10, 1960, Ser. No. 7,917
4 Claims. (Cl. 18—47.5)

This invention relates to improvements in methods of forming enclosed hollow articles such as toys made of plastic materials having supporting members located therein and extending outwardly therefrom when the hollow toy is made.

This application is a division of application Serial Number 642,822 filed February 27, 1957, now Patent Number 2,978,244.

More particularly, the invention relates to hollow rubber toys, such as a pony made from rubber latex by a compound rotation process in water-absorbing molds having a saddle member located in the mold and away from the mold walls during the rotary casting process and with one or more saddle supporting members extending through the mold whereby, when the pony or other toy is formed by the rotary casting process and subsequent curing of the rubber, the pony will have the supporting saddle inside the pony with its supporting member or members extending outside the pony for supporting the same.

When a toy of plastic material, such as a hollow rubber toy, or a toy of other plastic material, is made of relatively large size, such as a pony of a size which can be mounted by a child sitting on the pony, the hollow rubber or other plastic toy itself is not of sufficient strength to support a child. The rubber or other plastic pony may thus have a body size of around 32" and an overall size of around 44" and may have a wall thickness of the rotary cast pony of only around ⅛ of an inch.

The present invention provides an improved method for making such a toy and providing it with an internal support such as a saddle or seat and with one or more supporting elements for supporting the saddle or seat so that when a child is seated on the pony there will be adequate support for the child.

The invention also includes an improved process for making a toy in which not only a saddle but also a neck bar or neck piece is contained inside the mold and away from the mold walls during the rotary molding or casting operation, with a support or supports therefor extending outside the mold so that when the pony is molded and the molding composition cured, the saddle will support the pony at the saddle portion and the neck piece can have a handle bars secured thereto outside the neck of the pony so that a child sitting on the saddle and taking hold of the handle bars will have a rigid frame connection between the saddle and handle bars.

The improved toys of the present invention with internal supporting members can advantageously be made by a rotary casting process in which vulcanizable rubber latex in sufficient amount to form the toy is placed in a porous mold such as a mold made of plaster of Paris, and the toy formed by compound rotation of the mold about different axes located e.g. at right angles to each other according to the rotary casting process described, for example, in the Rempel U.S. Patents Nos. 2,469,892, 2,603,836 and 2,629,130.

In making the large toys such as the pony, the supporting member is located in the mold away from the sides of the mold and is supported and held by one or more supporting members extending through the mold during the rotary casting process, with the result that the toy is formed in the mold without any contact of the saddle or other support with the molded toy. The mold is formed at the saddle portion of a shape conforming to the shape of the saddle support located in the mold so that when the toy is formed and the plastic composition cured, the saddle support can be located at the saddle portion of the toy to support the same.

Special molds are required for making the toy with the supporting structure located therein and held away from the walls of the mold during the rotary molding operation. One mold section is provided with one or more tubular members extending inside the mold and also outside through which the saddle supporting member or members extend and with means for holding the saddle member away from the mold walls during the rotary process.

In some cases the mold can be made of two mold members, but with a toy such as a pony it is advantageously made of two side members and an intermediate member located between the legs of the pony and having the tubular member or members extending through the intermediate or bottom mold portion so that, at the end of the rotary casting operation and after further drying, the side members of the mold can be removed and the intermediate or bottom portion can be used to support the molded toy during a further drying or partial curing treatment until the toy has been dried or cured sufficiently to permit it to be removed from the intermediate supporting section of the mold. Thereafter the toy can be supported on a suitable supporting frame for the further drying and curing, after which the saddle support can be raised to the corresponding saddle portion of the toy and the neck piece when used raised to its final position in the neck so that laterally extending handles can be secured to the neck member.

In general, the toys which are made by the present process are toys of relatively large size and of the type where a portion, such as a saddle, is to be provided so that a child can ride the toy. In general, the toys are toys representing animals or large birds which a child can ride, including not only ponies but other animals, such as giraffes, zebras, donkeys, elephants, lions, tigers, etc., as well as large birds, such as an ostrich, or other hollow toys, where a portion which can be referred to as the saddle or other supporting portion is formed during the rotary casting process and where the supporting portion is located in the mold during the rotary casting process away from the walls of the mold, and with its support extending outside the mold so that, when the toy is molded, the saddle or other supporting portion can be raised into contact with the saddle portion of the toy so that the toy will be supported thereby, and in turn the saddle and toy will be supported by the supporting member or members which extend outwardly through the bottom portion of the toy.

The supporting member or members for the saddle or other toy support are advantageously one or more downwardly extending members such as a rod or tube which is adapted to be attached to or supported by different supporting structures when the toy is finished. And when a neck piece as well as a saddle are located inside the toy with hand bars secured to the neck piece, a child sitting on the saddle with his hands on the hand bars will have a rigid supporting frame between the hand bars and the saddle.

A toy such as a pony produced in accordance with the present invention is advantageously supported by a spring supporting frame located below the pony and with frame members providing a foot support for the rider.

The pony or other toy with its depending supporting rods or tubes can be used for many purposes and with many different kinds of supports. The pony or other toy can thus be supported on a merry-go-round or on a bicycle or on a rocking support, etc. A rubber toy, such as a pony supported in the manner described, with a supporting saddle and neck piece, will be otherwise unsupported. And a rubber pony, or other plastic toy, having a wall thickness of around ⅛" will be flexible and yieldable at other portions while the rider sitting in the saddle and with hands on the handles secured to the neck piece will have these parts rigidly connected together.

A rubber toy, such as a pony, can advantageously have a bridle on the head of the pony with reins which the rider can use, and the neck of the pony is sufficiently flexible so that by pulling on the reins the neck will bend and will return to its original position when the pulling is discontinued.

The invention will be further described in connection with the accompanying drawings illustrating one embodiment of the invention and the forming of a hollow life-like pony of rubber by the use of vulcanizable latex in porous molds, such as plaster of Paris molds, by the use of the rotary casting process such as described in the patents above referred to.

In the accompanying drawings:

FIG. 9 shows the completed pony, with parts broken away to show the location of the supporting saddle and neck bar.

Figure 1:
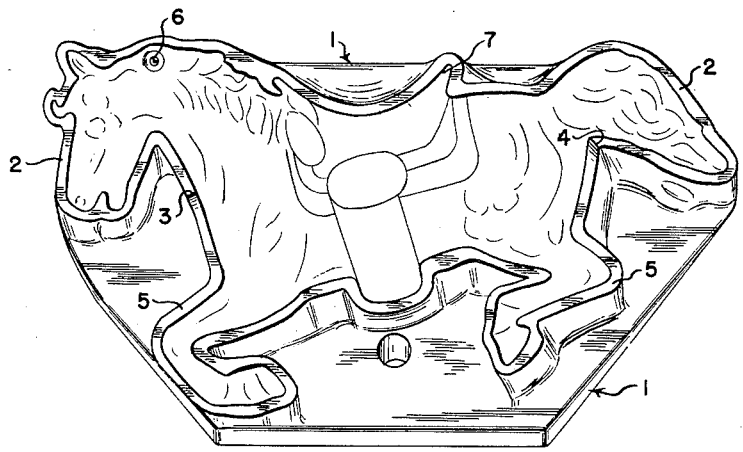
FIG. 1 shows one of two opposing side molds used in molding the pony by the rotary molding process, this view being in perspective.
Figure 3:
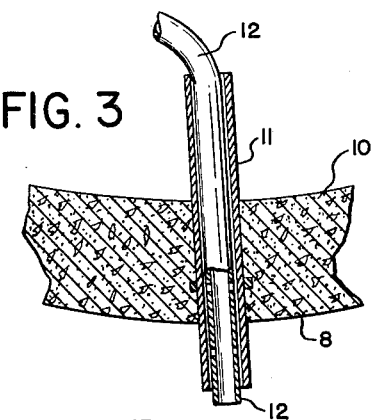
FIG. 3 is an enlarged view of a portion of the mold section of FIG. 2, with the saddle supporting member also shown.
Figure 2:
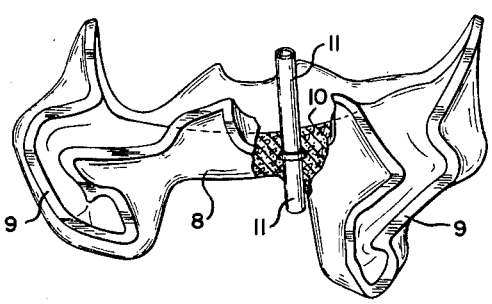
FIG. 2 shows the intermediate lower member of the mold which is located between the two side mold members, and with parts broken away, this view being also in perspective.
Figure 4:
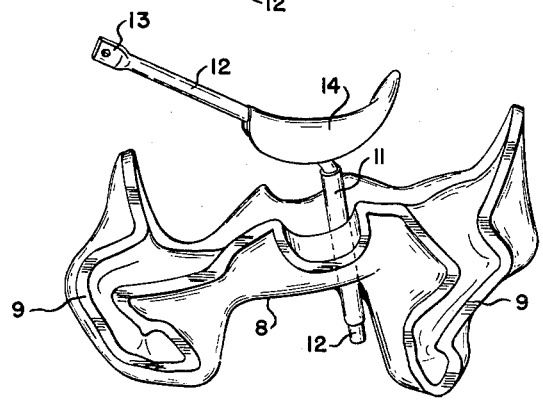
FIG. 4 shows the mold section of FIG. 2 in perspective and with the saddle and neck bar supported therein.

The molds used in molding the pony by the rotary casting process include two side members, one of which is shown in FIG. 1, and an intermediate lower mold member, shown in FIGS. 2–4. The wall sections of the molds are of water-absorbent material, such as plaster of Paris. The side mold member 1 shown in FIG. 1 has edges 2 which, between the points indicated at 3 and 4, come in contact with corresponding members of the opposite side mold member. The lower portions of the edges of the side member, indicated at 5 and located between the points 3 and 4, match with the edges of the lower mold member illustrated in FIG. 2.

When the side member of FIG. 1, the lower intermediate member of FIG. 2, and the opposite side member corresponding to that of FIG. 1, are united together, they form the complete mold in which the pony is molded by the rotary casting process.

In FIG. 1 projecting portions are indicated at 6 which form a recess and opening through which the handle bars are inserted, as hereinafter described. The side mold members have recesses indicated at 7, for forming complementary recesses in the molded pony for receiving the back of the supporting saddle as hereinafter described.

The lower intermediate mold section 8 illustrated in FIGS. 2 to 4 has edges 9 which match with the two side mold members, one of which is illustrated in FIG. 1. In FIG 2 a portion of the mold member is broken away to show the tubular member 11, which is molded therein when the lower mold member is formed. The mold member is formed e.g. of plaster of Paris, as indicated at 10 in FIGS. 2 and 3. This tubular member 11 serves for receiving and supporting the tube 12 which extends therethrough and to which the saddle 14 is secured and which has an extension forming a neck bar terminating in the flattened portion 13 having an opening therein to which the handle bars are secured, as hereafter described.

Figure 5:
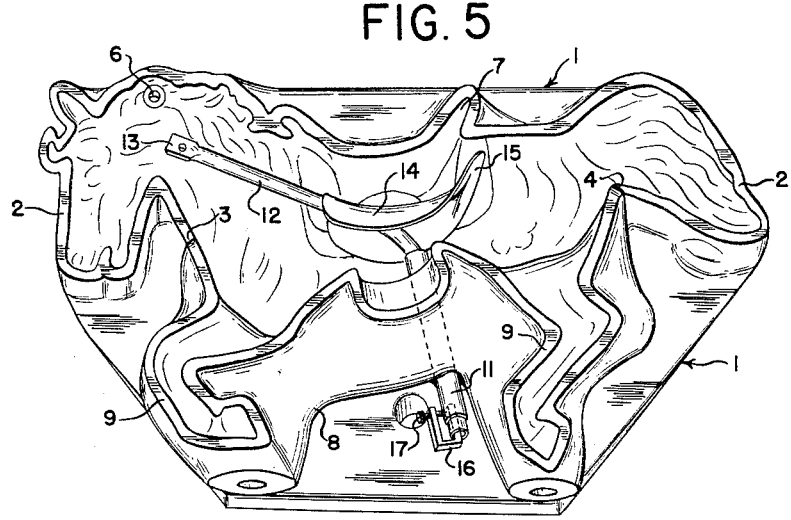
FIG. 5 shows the side member of FIG. 1 and the intermediate mold member of FIG. 4 with the location of the saddle and neck member during the rotary casting process.

FIG. 5 shows the lower intermediate mold member and one side member with the location of the saddle and neck bar in the mold, and with a clamp 16 of U-shape having a clamping bolt 17 for holding the members 11 and 12 from relative rotation during the rotary casting process. The arrangement of the tubular member 11 in the lower mold section, and of the saddle supporting bar 12 shown in FIGS. 4 and 5, is such that the upper end of the member 11 supports the member 12 at a proper distance away from both the upper and lower portions of the mold. And the clamp 16 prevents the member 12 from rotation during the rotary casting process.

When the side mold section illustrated in FIG. 5 is placed in a horizontal position and the intermediate mold member is placed thereon as illustrated in FIG. 5, the latex in proper amount for forming the pony is charged into the mold, the opposite side member is then added and the mold members are clamped together and are ready for the rotary casting process.

The rotary casting process is carried out by supporting the molds in apparatus which causes rotation of the molds on axes at right angles to each other, as described in the patent above referred to. This compound rotation of the molds is continued until the water in the latex has been absorbed by the porous mold to an extent sufficient to form the molded article on the walls of the mold. The compound rotation insures that all parts of the mold have the latex distributed thereover and the gradual absorption of the water in the porous mold results in the forming of a molded pony with uniform or approximately uniform wall thickness. The amount of latex used is such that the wall thickness of the molded and cured pony is e.g. about one-eighth of an inch, although this wall thickness can be varied somewhat.

The supporting of the saddle and neck bar in the mold away from the sides of the mold as illustrated in FIG. 5 enables the pony to be molded in its final form without contact with the saddle and neck bar.

Figure 6:
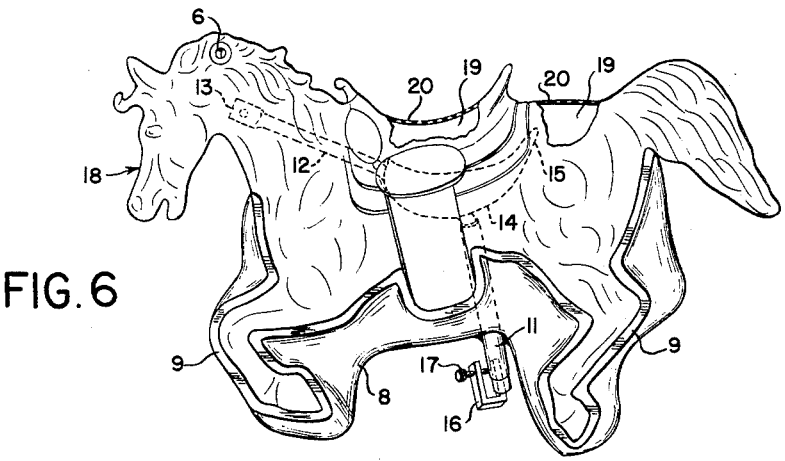
FIG. 6 shows the molded pony with the side mold members removed, and supported by the lower intermediate mold member.

After the pony has been molded in the rotary casting process, the mold is removed, the top side member is lifted off, and the intermediate mold member and molded pony are removed from the bottom side mold member so that the intermediate member supports the molded pony, as illustrated in FIG. 6, which has parts broken away at 19 to show the thickness of the rubber layer at 20.

In a molded article of the size of a pony, the molded walls at this stage do not have sufficient strength to support the pony without further drying. To accomplish this further drying, the pony is kept supported by the intermediate mold member, as illustrated in FIG. 6, and is subjected to a further drying of the molded pony by supporting it in suitable supports, as illustrated in FIG. 7, during this further drying.

Figure 7:
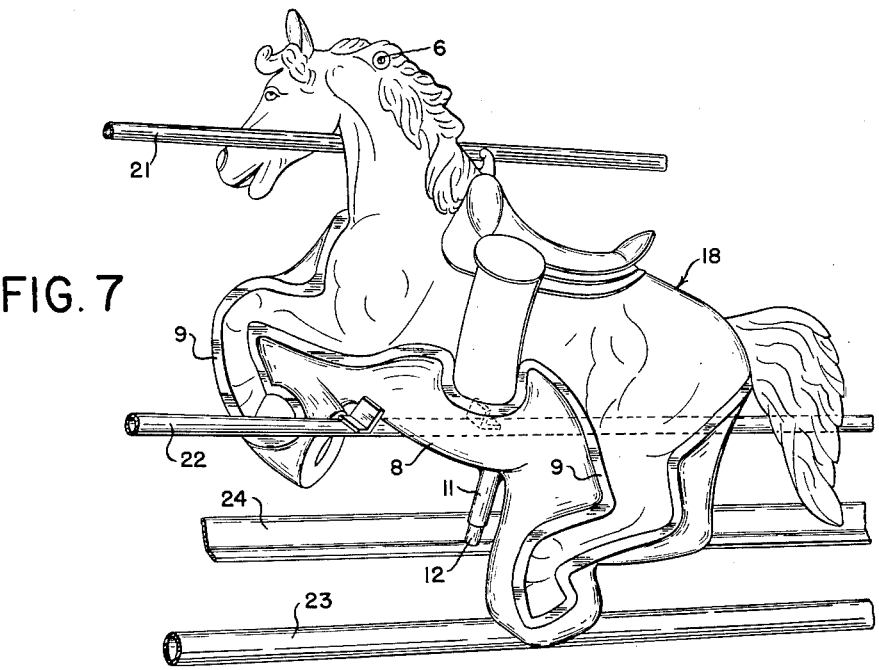
FIG. 7 illustrates the supporting of the pony and intermediate mold member during the further drying operation, the showing being in perspective.

FIG. 7 shows the pony supported by the lower mold section, with the rod support 21 for supporting the neck and head of the pony, and with rods 22 and 23 for supporting the mold member. The clamp shown in FIGS. 5 and 6 is removed and the lower end of the supporting member 12 is supported by a bar 24.

Figure 8:
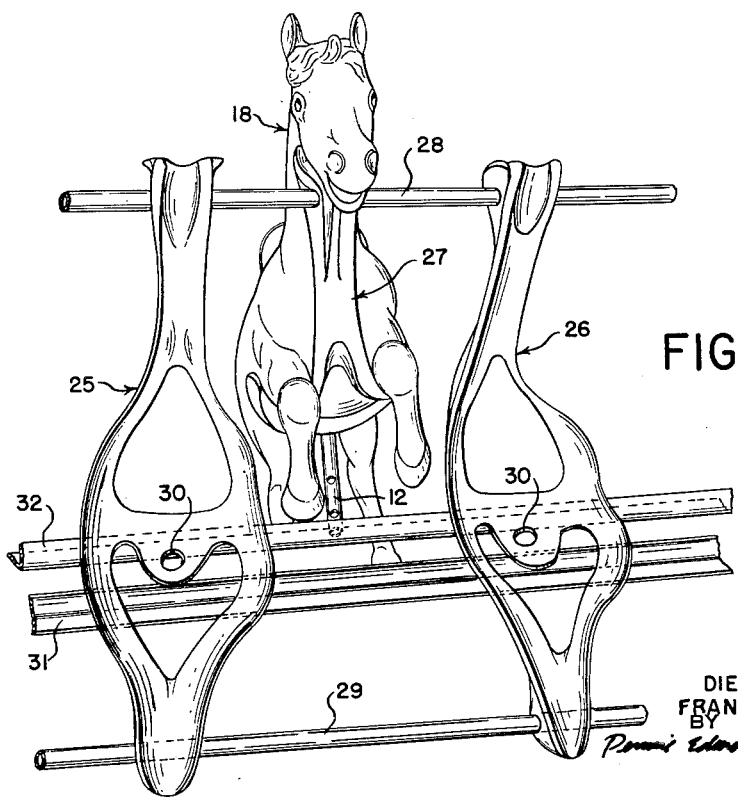
FIG. 8 shows how the pony is supported during the curing or vulcanizing treatment.

After further drying, the pony is then removed from the lower mold member and supported on an aluminum supporting frame, as illustrated in FIG. 8, where three supporting members are shown, two on one side, 25 and 26, and one on the opposite side, 27. These aluminum supports are secured at their upper ends to the bar 28 and at their lower ends to supporting bars, one of which is shown for the members 25 and 26 at 29. A similar bar (not shown) is located on the back side to support the lower end of the member 27. These aluminum supports have openings 30 to permit the supporting tubes 12 to pass therethrough, and supports 31 and 32 are provided for supporting the lower ends of these tubes.

The aluminum supports for supporting the pony shown in FIG. 8 have a contour which gives adequate support to the pony when it is subjected to the final drying and curing treatment. The further drying of the molded pony which takes place while supported on the bottom mold member, as illustrated in FIG. 7, may be, for example, one-half hour at 150° F. The further drying of the molded pony when supported by the aluminum supports as illustrated in FIG. 8 may be e.g. for a further period of one-half hour at 150°, to complete the drying. After the drying is completed the pony is placed in the curing oven, e.g., for a period of 45 minutes at 250° F., to cure the rubber latex and form the vulcanized rubber which forms the walls of the final pony.

When the rotary casting process is completed and the side wall members are removed, they can be used again in further carrying out of the molding process, and the intermediate lower members can also be used again when they have served their purpose in supporting the pony during the further drying operation.

It will be understood that while the carrying out of the process in a single mold has been described, in practice a series of molds will be operated and a number of molds may be rotated simultaneously by the compound rotation process on a schedule such that a series of molded objects can be continuously produced. The further drying and curing operations can also be carried out in a continuous manner and with a number of ponies molded in the manner above described.

The final molded pony is illustrated in FIG. 9, with portions at the top of the pony broken away at 33 to show the wall thickness 34 and to show the location of the supporting saddle and neck bar in their final position. It will be seen that the recess 7a molded in the pony to form the back of the saddle portion has the back of the saddle 15 located therein and that the contour of the saddle portion of the pony conforms to the shape of the saddle 14. The neck bar 12 extends up into and supports the neck and has handle bars 35 secured to the upper end of the neck bar 12 by means of the opening 13 shown in FIG. 4.

Where the supporting member 12 passes through the lower portion or belly of the pony, the lower wall of the pony is held in proper position with reference to the supporting member, as illustrated, for example, in FIG. 9, where a clamping member or grommet 38, e.g. of rubber, is placed on the supporting bar 12 and also serves to clamp the edges of the wall of the pony around its opening.

It will be noted from FIG. 9 that the supporting bar 12 extends down below the pony and is adapted to be secured to supporting frames or members of various kinds and that it constitutes the entire support for the pony.

It will also be seen that the supporting bar is rigidly secured to the saddle and to the handle bars so that when a child is seated in the saddle of the pony and grasps the handle bars, these members are rigidly supported with relation to each other.

The pony with a wall thickness of around ⅛″ has sufficient stiffness to maintain its normal form and yet it is resilient and yieldable when pressure is applied except where it is supported by the saddle and by the neck piece. Thus, the flexible nature of the neck and head of the pony is such that when a bridle is applied, as shown in FIG. 9, and a child pulls on the reins of the bridle, the head will bend so long as the pull is applied but will return to its normal position when the reins are released. A child sitting on the saddle is rigidly supported but the sides of the pony are yieldable.

While the drawings illustrate the process in connection with the production of a pony, the process is also applicable to the production of other hollow toys and particularly of toys which have a supporting saddle therein, or a supporting saddle and neck piece, and where the walls of the toy are of relatively thin plastic material and flexible and yieldable except where supported by the rigid supports.

The molding of the toy with the supporting framework located therein and held away from the molds during the rotary casting process enables the supports to be properly located in the molded toy with only a single supporting member extending downwardly for supporting the toy. Toys can thus be made of rubber or of other plastic materials without any seams or openings which require subsequent closure except for the openings through which the supporting member is inserted, and openings such as that for the handle bar in the neck portion of the toy.

The final pony with its single supporting member is adapted for use for many purposes and in many different kinds of supports, such as those above referred to.

While the pony illustrated has only a single downwardly extending rod or tube for supporting the saddle and neck piece during the rotary casting process, two or more downwardly extending members can be used, e.g., an inverted U-shaped tube, to which the saddle and neck piece are secured.

We claim:
1. The method of molding enclosed hollow plastic articles of resilient plastic material in which the plastic article is formed in a mold from liquid plastic material with compound rotation of the mold around different axes, which comprises locating in the mold, a substantial distance away from the walls thereof, a supporting element having supporting means extending out through the wall of the mold, molding the article in the mold without contact of the supporting element with the article formed by the compound rotation process, forming in the article, during the molding operation, a portion having a shape substantially complementary to the supporting element, and bringing the supporting element into contact with said complementary portion of the article after the molding of the article is finished.

2. The improvement in the formation of enclosed hollow rubber articles from rubber latex in water-absorbent molds, in which the molds are rotated around different axes during the formation of the article in the mold, which comprises arranging a supporting member in the mold and holding it a substantial distance from contact with the walls of the mold, molding the article in said mold while said supporting member is so held, the wall of the molded article between the supporting member and the wall of the mold opposite the supporting surface of the supporting member having a thickness less than the distance between said supporting member and said wall of the mold, said supporting member having a portion extending outwardly through the mold when the article is formed and forming a support for the toy after the article is formed, and bringing the supporting member into supporting engagement with said complementary portion of the article after the article is formed.

3. The improvement in the making of enclosed hollow plastic toys of resilient plastic material in a multi-part mold with compound rotation of the mold about two axes during the forming of the hollow toy therein, which comprises providing in the mold, during the molding operation, a portion corresponding to a saddle portion of the toy, locating a saddle support in the mold a substantial distance away from the walls of the mold, said saddle support having supporting means extending outwardly through the mold wall, molding a layer of resilient plastic material on the inside of said mold while holding said saddle member in said position in the mold cavity, and bringing the saddle support into supporting engagement with the wall of the toy after the toy is formed.

4. The method of forming an enclosed hollow rubber toy in a mold of water-absorbing material having two side members and an intermediate lower member which comprises providing tubular means in the lower intermediate member, locating a saddle support in the mold with a supporting element extending out through said tubular means, molding a layer of rubber particles from a rubber latex on the inside of said mold by compound rotation of the mold around different axes, holding the saddle member away from the walls of the mold and out of contact with the molded toy during the formation of the toy in the mold, removing the two side members of the mold, further drying the molded toy while supported by the lower intermediate member, removing the toy from said lower intermediate member after it is dried, subjecting the removed toy to a curing operation, and bringing the saddle support into engagement with the wall of the toy after the toy is cured.

References Cited in the file of this patent
UNITED STATES PATENTS

| | | |
|---|---|---|
| 2,569,869 | Rempel | Oct. 2, 1951 |
| 2,730,765 | Crafton et al. | Jan. 17, 1956 |
| 2,801,104 | Yetter | July 30, 1957 |
| 2,806,698 | Thoeming | Sept. 17, 1957 |
| 2,918,703 | Beal | Dec. 29, 1959 |
| 2,944,814 | Thoeming | July 12, 1960 |

UNITED STATES PATENT OFFICE
CERTIFICATE OF CORRECTION

Patent No. 3,031,720                          May 1, 1962

Dietrich G. Rempel et al.

It is hereby certified that error appears in the above numbered patent requiring correction and that the said Letters Patent should read as corrected below.

Column 1, line 55, strike out "a"; column 2, line 18, after "rotary" insert -- casting --; column 6, line 60, for "toy" read -- article --.

Signed and sealed this 28th day of August 1962.

(SEAL)
Attest:

ESTON G. JOHNSON
Attesting Officer

DAVID L. LADD
Commissioner of Patents